March 11, 1952 R. T. ERBAN 2,588,373

KINOPTIC DEVICE

Filed Oct. 8, 1947

4 Sheets-Sheet 1

Richard T. Erban
INVENTOR.

BY John M. Crane
Attorney

March 11, 1952

R. T. ERBAN 2,588,373

KINOPTIC DEVICE

Filed Oct. 8, 1947

4 Sheets-Sheet 2

Richard T. Erban
INVENTOR.

BY John M. Crane
Attorney

March 11, 1952

R. T. ERBAN 2,588,373

KINOPTIC DEVICE

Filed Oct. 8, 1947

4 Sheets-Sheet 3

Richard T. Erban
INVENTOR.

BY John M. Crane
Attorney

Richard T. Erban
INVENTOR.

BY John M. Crane
Attorney

Patented Mar. 11, 1952 2,588,373

UNITED STATES PATENT OFFICE 2,588,373

KINOPTIC DEVICE

Richard T. Erban, New York, N. Y.

Application October 8, 1947, Serial No. 778,571

4 Claims. (Cl. 88—28.93)

Figures 1, 2, 4:
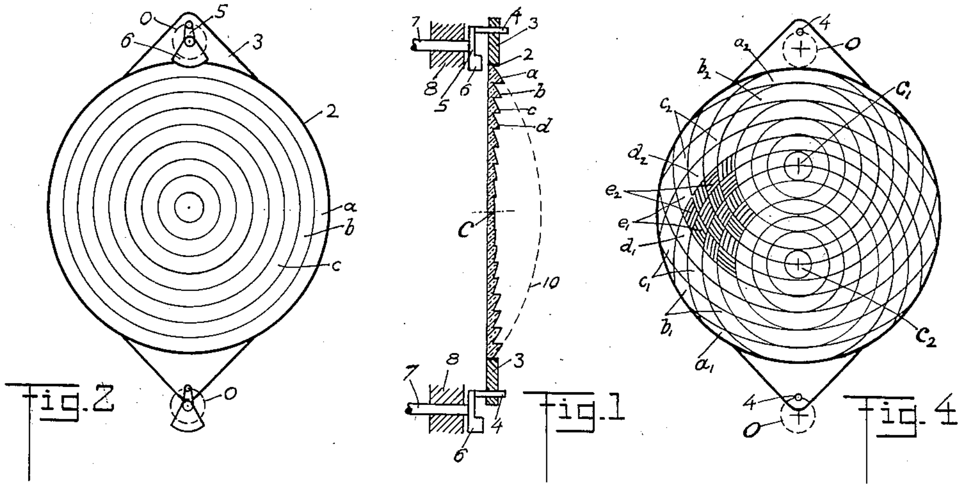

This invention relates to optical devices in general. In one of its particular aspects it relates to optical devices which serve to make optical real images to observers.

In systems where field lenses are used, great difficulties arise whenever the image field is of a size as to require field lenses of more than about 6 inches, because of the weight and cost of such lenses. As a remedy, it has been variously proposed to use lenses of the Fresnel, or lenticular type, as field lenses; however, the partition between two adjoining lenticular elements or "steps" of this type of lenses disrupt the continuity of the image and so destroy their usefulness. In order to overcome this, it has been proposed to make the "steps" very fine so as to make them less noticeable. It was found, however, that the images produced by such lenses have a streaky appearance, which obliterates image details and causes eye strain. The attempt to use a still finer system, of 2000 or more lenticular lines per inch produces phenomena usually observed on Spectograph gratings and are, therefore, wholly unsatisfactory.

To overcome these difficulties, the present invention in one of its aspects teaches how to make field lenses of sizes up to several feet in diameter, and even much larger, which are of little weight, and may be made very thin—so thin in fact that such a field lens may be a mere sheet which is so thin that it needs outside support to keep it in shape—while at the same time these new lenses have the same effect upon the eye of an observer as a conventional field lens, which has an optically continuous surface, i. e., not of the lenticular or Fresnel type.

In another of its aspects my invention teaches how lenses may be obtained for other purposes, such as magnifying lenses, which are—irrespective of their focal length—very thin with respect to their diameter. For example, a magnifying lens of 9 inches diameter and 10 inches focal length of ordinary glass would be about 2 inches thick in the middle. Following the teaching of my invention the same optical effect is obtained with a device which has a thickness of only about ⅛ of one inch, or even $\frac{1}{16}$, or even less thick if required, or in other words, a thin plate which performs like a magnifier lens several inches thick.

Still another object of my invention is to provide an optical device which has the effect of an optical prism while avoiding the bulk and weight of an optical prism of the customary kind.

Another object of my invention is to provide an optical device for making visible projected real images by reflection, while at the same time controlling the dispersion and the distribution of the reflected light over the entire viewing space in accordance with a predetermined and pre-selected law.

Still other objects of my invention will be pointed out from time to time in the following specification.

These and several other new results which will be pointed out hereinafter I achieve by a new combination of certain optical elements which may be either customary, or new, as hereinafter described, with means which impart a special form of motion to these elements.

I am, of course, aware that mirrors, prisms and lenses have been incorporated in apparatus where some form of motion has been imparted to them; however, because the new structure hereinafter described and the results obtained therewith differ fundamentally from those known devices, it is desirable in order to avoid confusion to use a clearly defined terminology for these new devices. The term "kinoptic screen" shall be used to designate a screen which is provided with a motion of such kind that an image projected thereon does not partake of this motion, while at the same time the effect of the motion changes the appearance of the screen and of the image to the observer's eye. And while several structures of this general character have been proposed, they did not achieve the performance obtained by devices according to the teachings of this invention, that is, the complete elimination of all texture or surface details from the appearance of the image, freedom of the image of any sign of motion of the screen, increase of the image definition (or resolution) to the equivalent of viewing the image directly without the medium of a dispersion screen.

The inventions herein described are termed "improved kinoptic devices," because the basically new form of motion and the structure to achieve this motion, enable the use of Fresnel type lenses instead of mere screens. The known devices of kinoptic character do not produce practical results if it is attempted to use them in combination with Fresnel lenses, and as far as applicant knows, no proposal has ever been made to use Fresnel lenses in such devices, and his kinoptic Fresnel lenses are the first ever to have been built and disclosed. Therefore the term "kinoptic screen, or device, or lens" shall hereafter be used to designate such parts or elements as having a motion of the general character described, without regard to the specific improvements disclosed by the present invention.

Figures 3, 5, 6:
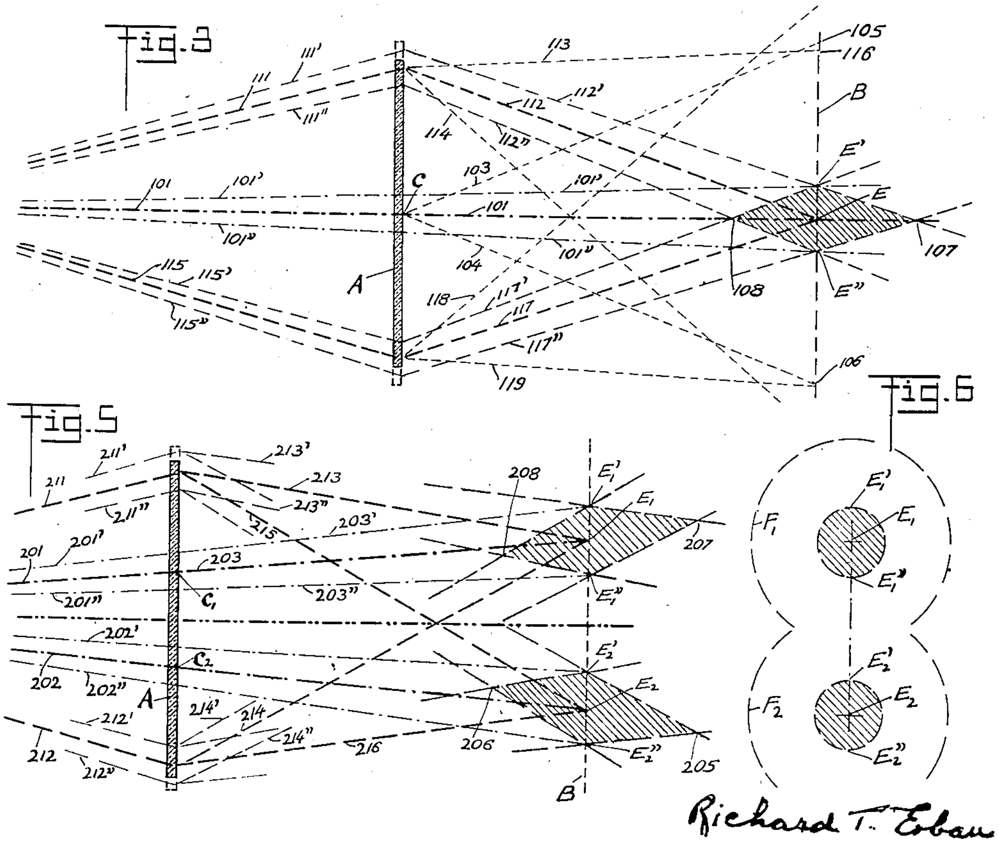
Figure 7:
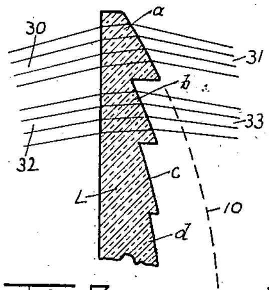
Figure 8:
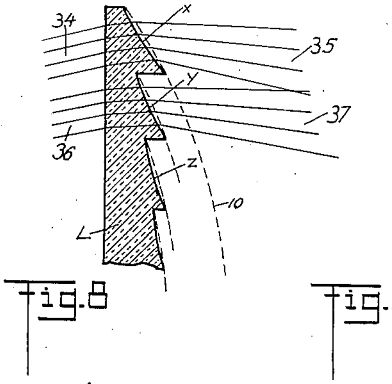
Figure 9:
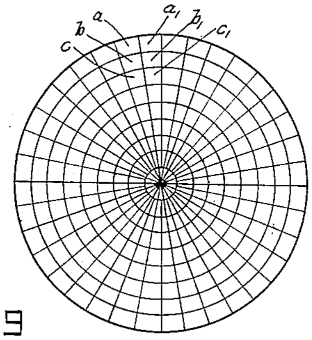
Figure 10:
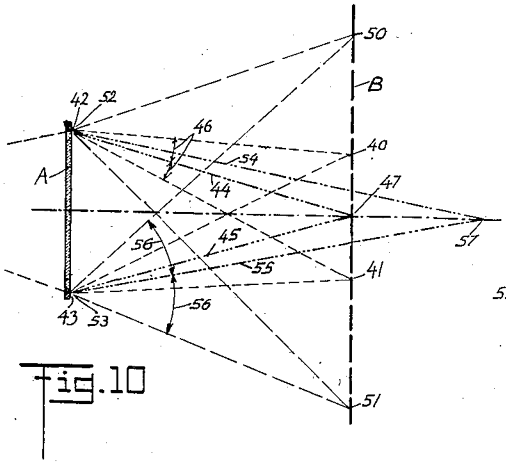
Figure 11:
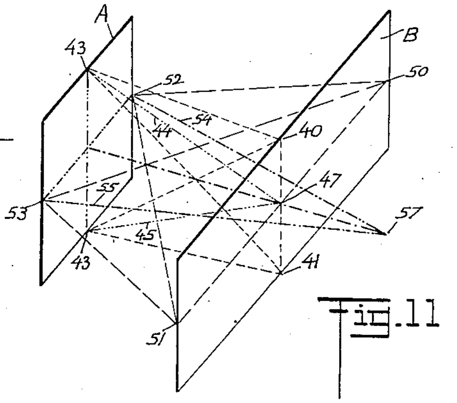
Figure 12:
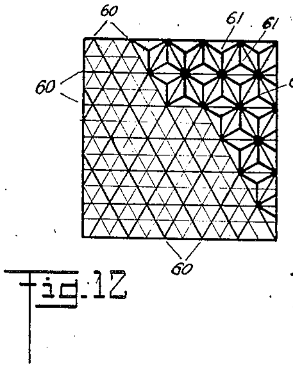
Figure 13:
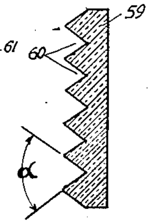
Figure 14:
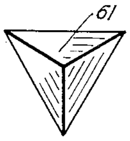
Figure 15:
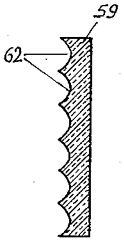
Figure 16:
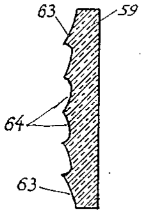
Figures 17, 18, 19, 20, 21, 22, 23, 24, 25:
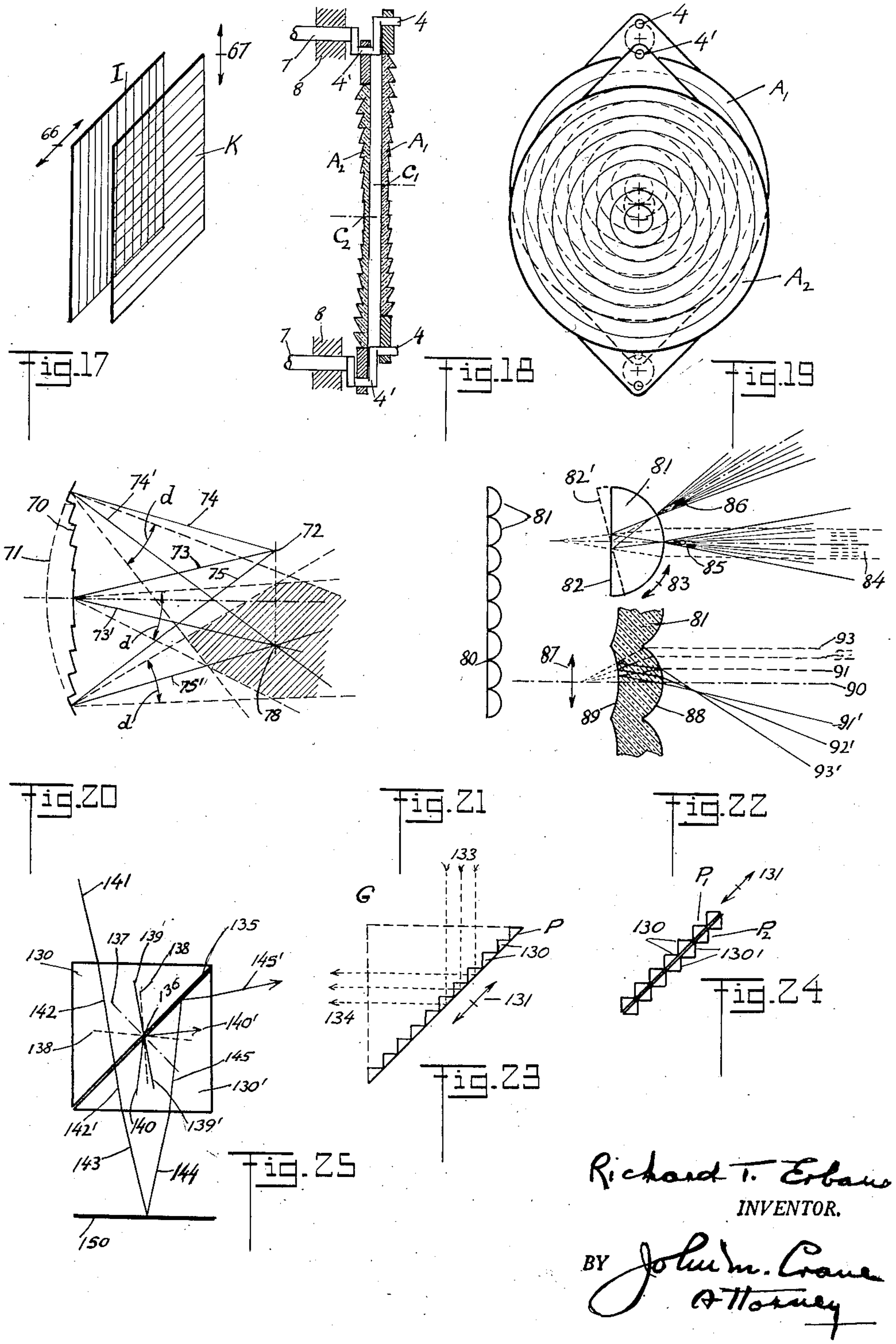
Figure 26:
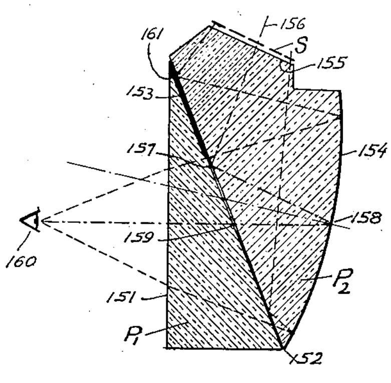
Figure 27:
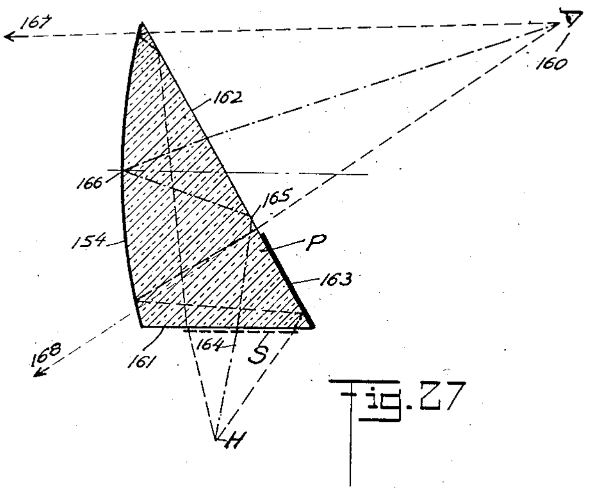
Figure 28:
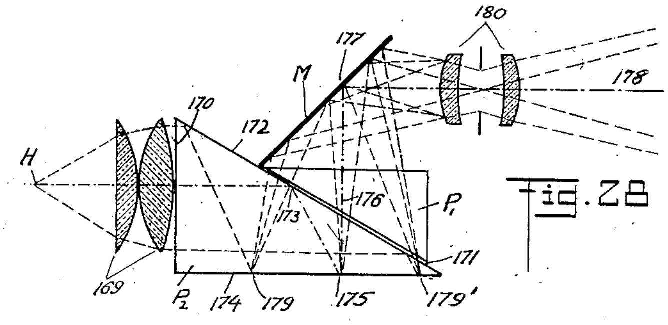
Figure 28:
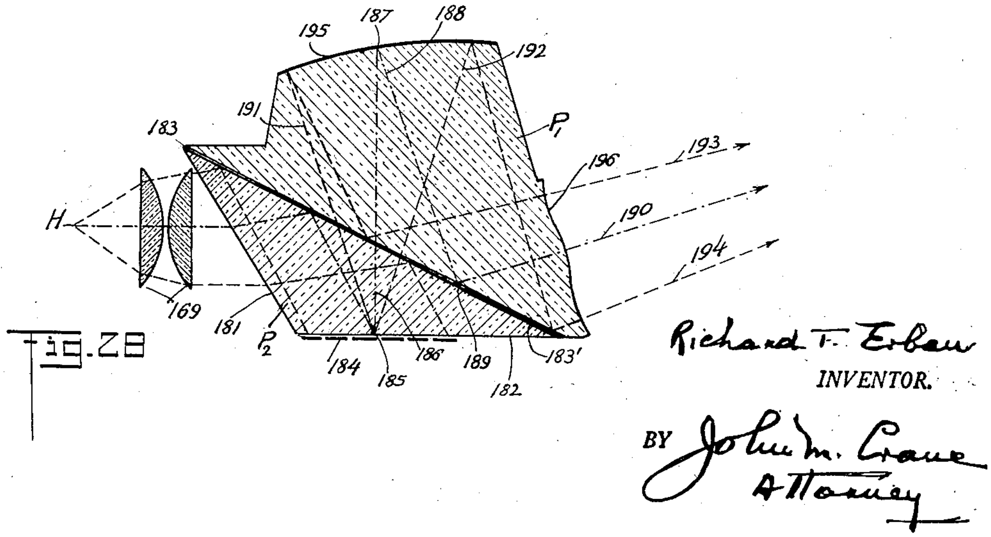

In the drawings:

Figs. 1 and 2 illustrate a kinoptic field lens structure in section and elevated view respectively; and Fig. 3 shows schematically a kinoptic field lens combined with light dispersing means and their combined effect upon the projected real image; and Fig. 4 shows another form of a kinoptic field lens; and Figs. 5 and 6 illustrate the effect of the structure shown in Fig. 4 upon the projecting light beam; and Fig. 7 shows a section of a conventional Fresnel lens; and Fig. 8 is a cross-section of a compound lens of the Fresnel type; and Fig. 9 shows schematically a composite lens of radial sections of Fresnel type; and Figs. 10 and 11 illustrate in form of diagram and of perspective view, respectively, the relative distribution of light intensity over a given area of observation, as obtained by kinoptic devices as described herein; and Figs. 12, 13 and 14 show a view, section, and dispersion element, respectively, of a screen type kinoptic dispersion device; and Figs. 15 and 16 illustrate cross-sections of other forms suitable for kinoptic dispersion screens; and Fig. 17 shows in perspective view schematically a still further arrangement of kinoptic dispersion screen; and Figs. 18 and 19 show in section and elevated view, respectively, a lens structure suitable as a magnifier or for similar purposes; and Fig. 20 illustrates diagrammatically a kinoptic screen of the reflection type and the formation of its image field; and Figs. 21 and 22 show top views of a kinoptic screen and top section and elevated section, respectively, of an element of this screen; and Figs. 23 and 24 illustrate kinoptic prisms of the single and duplex type, respectively; and Fig. 25 illustrates the travel of a light pencil through a duplex element of the kind shown in Fig. 24; and Fig. 26 shows the embodiment of a duplex type prism in a viewing and magnifying device; and Fig. 27 is a similar embodiment of a simplex type prism; and Fig. 28 illustrates the embodiment of a duplex type prism in an opaque projector.

Fig. 29 illustrates the embodiment of a duplex type prism in an opaque projector using a concave mirror and "Schmidt" lens.

Referring now to the drawings for a detailed description of some embodiments of my inventions—

In Fig. 1, 1 denotes the body of a Fresnel type lens with center C and ring shaped elements lettered *a*, *b*, *c* . . . beginning with *a* on the outside. This lens has the same local length as the conventional lens 10, indicated in dotted lines. While the conventional lens has an uninterrupted or continuous surface, the Fresnel lens has its surface, which may be spherical, interrupted by the steps which divide it into the ring-shaped elements. Thus its surface is discontinuous, and the "steps" or "partition lines" appear in the image and interrupt the continuity thereof.

Fig. 2 shows elevated view of the structure shown in Fig. 1. If such a lens is used as a field lens, the image will be divided into ring sections separated by dark circles. Even in combination with a diffusion screen, these dark lines show and mar the image. According to this invention, this lens is mounted in such manner that a motion thereof is caused relative to its optical axis. This is shown in Figs. 1 and 2 by mounting the lens 1 in a frame 2 which has brackets 3. Two crank pins 4 engage the brackets 3 and upon rotation of the shafts 7 in the bearings 8, the movement of the cranks 5 will cause each point of the lens

1 to execute a circular motion. Rotatable counterweights 6—6, which may be an integral part of the crank 5 as shown in Figs. 1 and 2 are provided to effect dynamic balancing of all movable masses. An inspection of the drawing will show that the balancing counterweights 6 are distributed symmetrically with respect to the mass center of the movable masses. This is done in order to prevent secondary vibrational forces. As the crank pins 4 follow a circle O, so every point of the lens has an identical orbit. The diameter of this circular path is at least slightly greater than the spacing of the lenticular elements or rings. As a result, the ring elements overlap during their motion and each two neighboring elements cover the same ground, though at different times. The speed of this motion is so arranged that the eye of the observer cannot follow it, but perceives only the average impression of the light passing alternately through one and the other element, with no sharp distinction between them. The dividing "dark rings" are thus completely eliminated, while the lens effect of the elements remains substantially unaltered. It has been stated that the lens was supposed to be placed in a structure where it serves as a field lens, either in front or behind a diffusion screen, or, with no screen at all.

In either case, the projected image to be made visible to the observer is formed in or very near the plane of the field lens, and therefore the motion of the lens has no effect upon the formation of the image. In other words, the image stands still to the eye of the observer, even though the lens moves in the manner indicated. Therefore, an optical structure which includes a Fresnel type lens positioned as a field lens with respect to the rest of the structure, and with means to cause motion, as specified, to the Fresnel lens, in accordance with this invention, results in producing a visible image the same as a solid, stationary lens having a continuous surface with no motion imparted to the image itself.

There is a secondary effect obtained through the motion of the lens, and that is a broadening of the eye point of the field lens, into a certain form of space element. This is more fully illustrated in Fig. 3.

Since the "steps" of the Fresnel lens may be made very small, the lens is shown as a flat plate, lettered A (see Fig. 3). When under the influence of the specified movement, it changes its position within the confines of the marginal positions indicated in dotted lines. Similarly its center C moves in a circle between the marginal positions C′ and C². It is supposed that an image is projected from the left side into the lens A. There are shown the central ray 101 and two marginal rays 111 and 115, and these would be the position of these rays if the lens were stationary in the central position. Due to its movement, the center C follows the circular orbit O and the central ray moves on the surface of a cone showing the two extreme positions 101′ and 101″ on the one hand and 115′ and 115′ on the other hand.

It shall now be presumed that no diffusing screen is combined with the field lens. In that case, the refracted rays unite at a point on the optical axis called the eye point, as is well known. The refracted rays for the stationary lens are 101, 112 and 117 respectively, and the eye point E.

Under the influence of the kinoptic motion, each of these rays illustrated follows its orbit, and the eye point also moves on an orbit between the extreme positions E' and E''. It is noted that this orbit at the plane of the observer B is larger than the orbit of the lens elements, and increases with increasing distance of the observer from the field lens. Furthermore, if an additional movement is imparted to the lens, so that its center C does follow a path which covers the entire surface of the orbit O, instead of merely following its periphery (this can be obtained by combining an oscillation movement with the rotary motion) then it becomes apparent that the eye point E at the plane of the observer B does cover the entire surface within a circle between the points E' and E''. The marginal rays 112 and 117 respectively also cover the entire cross section of a cone outlined by the rays 112'—112'' on one side and 117'—117'' on the other side. The portion of space which is common to both these cones and to the cone 101'—101'' of the central ray is then an area from which the image may be seen in its entirety. In other words, the eye point E of a stationary field lens has been widened to a portion of space, indicated in one of its sections by the shading between the points E'—107 and E''—108.

Instead of using a superimposed oscillation, as before mentioned, a very small dispersion or diffusion of the light leaving the field lens will achieve substantially the same result. If a larger dispersion angle is used, such as indicated by the rays 103 and 104 for the central ray 101, a wider area of visibility for the projected image is obtained. Using the same dispersion angle for the marginal rays 112 and 117 respectively, gives dispersion cones 113—114 for ray 112 and 118—119 for the ray 117. The zone of visibility upon the plane B lies between the points of intersection 105—106 and 115—116 respectively, and the area of visibility also extends in front and to the rear of the plane B. This area is further slightly widened by the motion of all rays along their orbits. The advantage of the kinoptic structure over a conventional field lens becomes quite clear if the two systems are compared with respect to their cost, space requirements, and results obtained.

Another form of embodiment is shown in Fig. 4, and its effects in Figs. 5 and 6, and this structure may serve for other purposes than those now described. The physical construction of this arrangement comprises a lens body proper and a frame movably supported on crankpins 4—4 which revolve in circular paths O—O. This is identical with the structure shown in Fig. 2, the only exception being the different form of surface given to the lens body proper, which form is in Fig. 4 a composite of two interwoven Fresnel lenses instead of one lens in Fig. 2. Therefore, Fig. 1 is a correct cross section of the lens body and the movable crank support shown in Fig. 4 and it illustrates how the required motion (circular path O—O, Fig. 4) is obtained. The lens shown has the peculiarity that it possesses two optical centers, and it is in other words, an intimate mixture of two lenses. Fig. 4 illustrates how this is done. There are two centers, $C_1$ and $C_2$ spaced apart by a pre-selected distance. Both lenses are of the Fresnel type, and as the ring elements intersect each other the resulting smaller pieces of surface are coordinated alternately to the one and the other center. In effect, here are two lenses cut up into little pieces and mixed like a mosaic.

A part of the drawing indicates by shading in lines concentric with the respective center how these elements alternate. Several others have been numbered $a_1$, $b_1$, $c_1$, $d_1$, $e_1$, beginning from the outer edge, as belonging to the center C, and similarly $a_2$, $b_2$, $c_2$, $d_2$, $e_2$, as being concentric to center $C_2$. The kinoptic motion is of such amplitude as to intermingle at least two adjacent elements and it is preferable if it is greater. A lens of this type when used in the position of a field lens produces results as illustrated in Figs. 5 and 6. Each of the two lens centers can be regarded in the same way as has been shown for the single lens system of Fig. 3, since the two lenses will not interfere with each other.

There are now two central rays 201 and 202, respectively, and each moves in an orbit (201'—201'' and 202'—202'') and while there is one and the same marginal projecting ray 211 and 212 respectively, they are refracted alternatingly, (depending whether an element of system 1 or of system 2 is in the spot where that ray impinges) into the directions indicated by the rays 212'—212'' for the system 1 in the upper part and 213—213'—213'' for system 1 in the lower part. The corresponding rays for system 2 are 214 in the upper part and 215 in the lower part, the orbit positions being shown but not numbered to avoid confusion of figures.

Since the diagram is symmetrical with respect to system 1 and 2, it is sufficient to show the ray tracing for one of them. The result to the eye of the observer stationed at the plane B is for each system analogous to that shown in Fig. 3, except that each eye point $E_1$ and $E_2$ together with their respective eye zones $E_1'$—$E_1''$ and $E_2'$—$E_2''$ are displaced laterally, their distance depending upon the selected distance of the centers $C_1$ and $C_2$ and the distance of the observer B from the field lens A. The resulting distribution of light is shown in Fig. 6, where the two shaded circles corresponding to the areas of visibility are similar to what has been said with respect to Fig. 3 for a single system.

By using dispersion means in combination with the field lens structure of Fig. 4, a light distribution may be obtained as illustrated in Fig. 6 by the circles $F_1$—$F_2$, and in this way the visibility zone is stretched predominantly in one direction while keeping it confined in the other, thereby creating a greater intensity of illumination.

It should be noted that a composite lens, such as illustrated in Fig. 4, need not be confined to two individual lens systems. There may be three or more, and their centers may be arranged in any preferred pattern, regular or not. In addition, these lens systems need not be of the same focal length but combine any predetermined selection, whereby the eye zone can be further extended in the direction of the optical axis. It should further be noted that a lens system of the type shown in Fig. 4 may be caused to rotate around the common center, (in Fig. 4 situated halfway between the two centers $C_1$ and $C_2$) and this motion likewise results in alternating the effect of the lens elements upon any given ray, or in other words, mixing the two lenses, without imparting any motion to the observed image. The light distribution at the observer plane would however be different from that shown in Fig. 6 and would now consist of a ring shaped zone, with the width of the shaded circles of Fig. 6 and the ring's center halfway between $E_1$ and $E_2$.

Other forms of light distribution will result if other forms of orbits are used, such as elliptical, etc. as have been described in my co-pending application Serial No. 754,548.

Figs. 7 and 8 show another means by which the distribution of light may be controlled. Fig. 7 shows a conventional Fresnel lens in part section, the lens being L and having ring elements *a, b, c, d,* etc. of the same curvature, all corresponding to the continuous lens surface 10. For a given position, beams of rays 30 and 32 entering from the left side are refracted so as to emerge as converging beams 31 and 33 respectively. This kind of lens when used stationary produces a single eye point analogous to a conventional lens.

In order to achieve the desired distribution of light, the individual ring elements may be made with various focal length, differing alternately, or successively, and they may even be made with a different sign of curvature. Such a case is illustrated in Fig. 8, where the individual elements have a general basic curvature according to a positive lens 10, and each element has a negative curvature of its own, thus causing dispersing of the partial light beam impinging upon it, while at the same time causing a general conversion of the entire light. Kinoptic motion of these lenses causes a correct averaging of the effect without imparting motion to the observed image. A further form of a composite lens that may be used to advantage with a kinoptic system is shown in Fig. 9, where the lens is composed of ring elements and radial sector elements. As each ring element is subdivided into smaller parts by the sectorial divisions, adjoining sub-elements in each ring may be made with varying form as to curvature and sign, and in this manner any desired form of light distribution can easily be obtained if a kinoptic motion of the required amplitude is applied.

Figs. 10 and 11 illustrate how focal length (or eye-point distance) and dispersion has to be selected in order to obtain a desired pattern of light distribution. It is supposed that a square screen A should be visible from the observer plane B with equal intensity from a zone reaching from 40 to 41 in the vertical direction, but stretching from 50 to 51 in the horizontal direction. To avoid confusion, it should be noted that both vertical and horizontal section are positioned one on top of the other in Fig. 10, while they are shown in perspective view in Fig. 11. In Fig. 10, the distribution of light in the vertical zone requires a very small dispersion angle 46 and a near eye point at 47. Only the rays from the edges of the screen have been shown, being ray 44 with dispersal cone emanating from point 42 on top of the screen A, and ray 45 emanating from point 43 at the bottom of the screen A. The two extreme points at the horizontal diameter of the screen are 52 and 53, showing in the diagram superimposed on 42 and 43, but being distinct therefrom in Fig. 11. The wide horizontal spread requires a longer focus, eye point at 47, and a greater dispersion angle 56.

Fields of vision of strictly rectangular form are easily achieved with a dispersion screen composed of prismatic lenticular elements, and this may be carried out in several ways, some of which are illustrated in the Figs. 12, 13, 14, 15, 16 and 17.

Fig. 12 shows a view of a screen formed by the intersection at 120° angle of three systems of prismatic grooves. At the lower and left part of the screen is shown how these systems of grooves intersect each other, and the right side upper corner illustrates what the surface looks like after the intersection has taken place.

Fig. 13 gives a cross-section through one system of grooves. There remain standing after the mutual intersection a system of three-cornered pyramids with an equilateral triangle as a base, and if the angle alpha of the grooves is selected so that the cotangent of ½ alpha equals the square root of 2, the resulting pyramids have the peculiarity that their sides are inclined at 90° towards each other. This is shown in Fig. 14. If the observer looks at this screen from the open, or hollow side of these pyramids, he is free from any reflection of outside light that might fall upon the screen, because these pyramids of 90° side angle have the property to reflect back into its own direction any light that might fall upon it. Therefore, no other reflection of light can reach the eye of the observer than that emanating from his own face near his eyes. The distribution of dispersed light by these pyramids, however, requires frequently the modification of their form, by rounding their edges or the insertion or formation of rounded bottoms in the grooves. These measures impair to some extent the freedom from reflected light. Such a shape of the grooves is illustrated in Fig. 15 showing rounded grooves 62 on a screen body 59. A screen like that shown in Fig. 12 would have a generally uniform dispersion in the main directions and if it is desired to limit the distribution of light to special areas, it may be obtained by gradually changing the shape of the lenticular grooves, such as illustrated in Fig. 16. Here the grooves are so arranged that the light from the grooves at the edges 63 is directed more towards the middle while the light emanating from the middle portions is allowed to spread symmetrically, due to a more symmetrical form of the grooves 64.

Instead of arranging several systems of grooves on one screen, they may also be arranged on several screens as is shown in Fig. 17 where two screens of lenticular grooves I and K are placed close to each other in such a manner that each may be imparted with a kinoptic motion, as indicated by the arrows 66 and 67. A simple straight line oscillation at substantially right angle to the direction of the grooves is not satisfactory, but many other forms of motion could well be used. For the sake of clarity, the two screens I and K are shown well apart from each other in Fig. 17, while actually both would be so positioned that each is close to the focal plane of the projected image.

Another form of kinoptic device, which may serve not only as a field lens, but also a magnifier, condenser or other purposes, is illustrated in Figs. 18 and 19.

In Fig. 18, which shows an elevated cross-section $A_1$ and $A_2$ denote two Fresnel-type lenses placed adjacent to each other. Each of these lenses is similar to the lens shown in Fig. 1 above, and each is also mounted in a similar way, to be set into motion by means of cranks 4—4 and 4′—4′ respectively. These cranks are connected to two shafts 7—7 in a manner to insure their motion with a 180° phase difference, that is in directions opposite to each other as shown in the drawing.

Rotation of the shafts 7 causes circling motion of each of the lenses, and the lenses always moving in opposite directions and with equal numerical speed. In such a structure, if the optical power of one lens is identical to the other, it will be observed that the motions compensate each other to the extent that no motion is imparted to any light ray passing through the structure. While an image projected by one lens will move if the lens is in motion, this is not the case with the structure I have illustrated. An image projected by my structure will be stationary, if the object is stationary. Such a structure can therefore be used as a magnifier, a condenser lens, or even as a projection lens, if the ring shaped elements are accurately made. Since such lenses may be made extremely thin, the chromatic aberration can be held to a minimum for rather high powered lenses, and in this way "infinitely thin" lenses may be had with short focus. Other distortions and aberrations may be reduced by "bending" the lens, that is, superimposing the Fresnel structure upon a spherical plate, or lens body, instead of upon a plane plate, as shown. In this case, it is also advantageous to replace the straight cylindrical separation walls between the ring elements of the Fresnel lens by conical surfaces with the apex of the cones preferably at the focus, or at the image point, in order to reduce the percentage of light that strikes these separation walls and is thereby lost.

Only a few of the modifications of this particular structure shall be mentioned, as it would go beyond the scope of this specification to illustrate all possible variations. The two Fresnel lens surfaces may be applied to one lens body, so that the two lenses $A_1$ and $A_2$ shown in Fig. 18 form one solid piece, which is then rotated around a center which may be located halfway between the points $C_1$ and $C_2$. The center of rotation may also be located outside the line connecting $C_1$ and $C_2$; and as a further modification, there may be arranged more than two lens systems with their centers separate from each other. In a system of more than two lenses, or with lenses of various different power, it should be noted that the vectorial sum of lenspower times kinoptic speed and amplitude taken over the whole system should be zero in order to prevent the imparting of motion to the light passing through it.

Fig. 20 illustrates a kinoptic structure embodied in a screen of the reflection type, for making visible a projected image. The screen 70 is composed of ring-shaped elements each of which may be spherical similar to a spherical surface 71. Each of these ring shaped elements is provided with a light diffusing surface causing a scattering of light within a cone around the reflected ray. This is illustrated for three rays emanating from a point 72 in front of the screen 70. This source of light may be the projection objective. The ray 74 would be reflected as ray 74' if no diffusion took place. With diffusion, the light is scattered within a cone of apex angle *d*, its outlines being shown in dotted lines. Similarly, a ray 73 impinges upon the center of the screen and is reflected at 73', and the diffusion forms a cone with the same angle *d* around this ray. A third ray 75 is reflected as 75' and a diffusion cone formed around it. The point 78 would be the point of intersection for the reflected rays, if no diffusion took place, and would be the eye point from which the image can be observed. With the diffusion, the shaded zone is common to the diffusion cones, and outlines the area from which the image may be observed.

Another type of screen is shown in Figs. 21 and 22, and it is illustrated as a reflection type screen, although it should be noted that the same basic structure, with some modifications that will be indicated, may be utilized for a transmission screen.

The screen 80 is composed of separate elements 81, shown in the general form of rods or elongated prismatic bodies. They may be of various other shapes, all of them however having in common the composite structure of independently movable elements.

Fig. 22 shows on top an enlarged cross-section of one element and at the bottom an elevated section of the same element. The cross section of the elements 81 is semi-circular, with the rear face silvered, or otherwise made reflective to light. The kinoptic movement is an oscillation, as indicated by the double arrow 83, plus an up-and-down oscillation longitudinally to the rod as indicated by the arrow 87. Returning to the (upper) cross section, it will be seen that the oscillation to one side, moves the rear surface from its position 82 to the position 82'. A beam of parallel rays 84, shown in thin dotted lines, will upon striking the surface converge as indicated, and upon reflection by the rear surface, emerge as the beam 85, as shown in thin full lines. In other words, with the element 81 in its central position, there is a reflection of light and a dispersion thereof in the same direction from which it came.

If the element 81 now oscillates, so that the rear surface takes the position 82', the entering beam 84 is reflected to one side and emerges as beam 86, the angle of deflection from its original direction being twice the angle of oscillation of the reflecting surface 82. It is apparent that approximately the same result could be obtained by oscillating only the reflecting surface, and leaving the element 81 stationary, and that there are two factors of dispersion; the first being determined by the optical constants of the element itself (cross-section, curvature, etc.) while the second is determined solely by the amplitude of the kinoptic motion. If this motion be made non-symmetrical with respect to the central position, the image area likewise will be non-symmetrical, and in this way the distribution of light over the visibility area may be fully controlled. In the elevated, or longitudinal section of the element 81, at the bottom of Fig. 22, there is shown the control of dispersion of the incident light through longitudinal oscillation of the element. This is illustrated for a single ray 90, which upon striking in the center of the bead-like surface is reflected in its own path. If the element follows the motion indicated by the arrow 87, the ray 90 may take any of the successive positions 91, 92, 93 and be reflected as rav 91', 92', 93' respectively. It will be seen that the angles of deflection increase with the greater amplitude of the element 81. It will be understood that instead of using bead-like surfaces 88 and 89 for the front and rear respectively of the element 81, various other forms may be applied, and that the reflecting elements may be separate from the prismatic elements, and may be either individual elements themselves, or one common carrier with a suitable formed surface. As an example, a structure as shown in Fig. 17 may be combined with a reflecting surface, or elements of reflecting power arranged substantially along a surface, and either uniformly or individually set in motion.

Fig. 23 illustrates the embodiment of kinoptic prisms in such cases where no dispersion of light is desired, but where for reasons of weight, bulk or for some other reason it is desired to avoid a conventional prism. A prism P is composed of a multitude of small elements 130 and subject to a kinoptic motion 131. The effect of this structure upon a beam of parallel rays 133 is the same as that of a solid prism G, and the rays are deflected by total reflection to the left, as indicated at 134. Prisms of this type may be used to separate light rays into one part which is totally reflected and another which is transmitted through the prism, depending upon whether the angle of incidence is greater or smaller than the critical angle. However, in a single prism of approximately 45° there is colour dispersion in the transmitted light, and if this is to be avoided, a duplex arrangement such as shown in Fig. 24 must be used. The two sets of prismatic elements may be of identical size and may be subject to a common or to individual kinoptic motion. Fig. 24 shows two identical sets of prisms, $P_1$ and $P_2$, composed of elements 130 and 130′ respectively, which are oscillated as indicated at 131.

Fig. 25 illustrates an arrangement in which the described prism is utilized to separate the light which illuminates an object (or picture) from those light rays reflected by it so that only the latter are visible to the eye of the observer. The elements 130 and 130′ are separated from each other by a narrow layer of material of low optical density, 135. This may be air, or in specific cases a liquid or cement with a refraction index lower than that of the material from which the elements 130 and 130′ are made. For a given point 136, the zone within which rays will be transmitted is determined by a cone shaped space 138—138 around the line 137 perpendicular to 135. All rays within this cone (example 139—139′) are transmitted all outside (example 140—140′) are reflected.

The ray 141 upon entering element 130 is refracted as 142 and its angle of incidence being within the critical angle, is transmitted as 142′ and finally emerges as 143, parallel to its original direction, as is well known. Ray 143 now impinges upon the object 150 and the reflected ray 144 re-enters the prism 130′, is refracted as 145 and since it strikes the separating layer 135 at an angle greater than the critical angle it is totally reflected and emerges as ray 145′. Therefore, an observer looking at the prism 130′ from the right side sees the object 150 as illuminated by the light coming from 141, but without seeing the source of light.

A practical application is shown in Fig. 26 where $P_1$ and $P_2$ are two prisms separated from each other by the low-optical-density layer 152. The prism $P_2$ has one of its surfaces formed as a concave mirror 154 while the other (155) is flat to receive the objects to be viewed by the eye of the observer 160. If the object S is a transparent photograph, illuminated from above, it can be seen that the central ray enters the prism $P_2$ through the surface 156, impinges at the point 157, is totally reflected towards the concave mirror 154 and reaches it at point 158; here it is again reflected, and as it reaches the separating layer with an angle smaller than the critical, it is transmitted through to the surface 151 of prism $P_1$ and emerges as 159 to reach the eye of the observer 160. The drawing also shows the tracing of rays from the left hand and right hand edge of the object S, but no numerals have applied to them to avoid confusion.

It should be noted that the ray from the left hand edge reaches the separating layer 152 at the point 161 with an angle of incidence with the critical limit, and would therefore be transmitted through, instead of reflected to the concave mirror. In order to avoid this, and insure reflection, the upper part of the surface of $P_2$ bordering on the separating layer 152 is silvered (or otherwise made reflective) as indicated by a heavy line at 153. This may be done without impairing the function of the device, because this small section is not in the path of light from the concave mirror 154 to the eye 160 and is not called upon to transmit light on a through-path. The effect of this arrangement is for the eye of the observer at 160 to see a visual and enlarged image of the photograph at S. The advantage of this arrangement is obvious, for without the use of the prisms, the object S would have to be placed in front of the concave mirror, very close to the eye of the observer, and in most cases it would fall within the line of vision of one of the observers eyes. The object S may also be a small projected image or television image, which is then viewed enlarged through the concave mirror. By the application of anti-reflection coatings, a total efficiency of 90% and more is obtained which is a radical improvement over arrangements using a thinly silvered mirror in front of a concave mirror, where only 25% of the light is transmitted to the eye.

While a structure of the latter kind may be utilized with solid, stationary prisms for smaller dimensions, it becomes rather heavy and expensive when larger sizes of concave mirrors are to be accommodated, and in these cases, the advantages of the use of kinoptic prism plates becomes obvious. The arrangement then consists only of a concave mirror, and a plate of duplex kinoptic prisms, such as shown in Fig. 24, positioned in front of it at the angle indicated by the separation layer 152 in Fig. 26.

By suitable selection of the prismatic angles other than 45° it is possible to achieve similar results with but a single prism, and yet avoid colour dispersion. Such an arrangement is illustrated in Fig. 27, where the single prism P has a surface 161 near which the object S is placed, another surface 162 which faces the observer 160 and a third surface forming a concave mirror 154. The lower part 163 of the surface 162 is silvered as indicated by a heavy line. Illuminating rays coming from a light source H will reach the eye after having been totally reflected by the surface 162 and again reflected by the concave mirror which is of course also silvered or otherwise made reflective. The central ray tracing is 164—165—166 to 160 and the rays from the edges follow similar paths. As a result, the eye 160 sees the object S in the rearward extension of the rays, as indicated at 167 and 168, and this visual image is enlarged. If the solid prism P is replaced by a kinoptic prism, a single type prism plate, such as shown in Fig. 23 may be used, with the understanding that the angles of the prisms differ from 45°, according to the laws of optics.

Another application of the kind of prism described is shown in Fig. 28, which illustrates an opaque projector. The light from a source H passes a condenser system 169 and enters a prism P. It is then totally reflected (point 173 for the central ray) towards the base 174 of the prism, against which the picture, or other flat object is placed.

The reflected light passes through the separating layer 171 and after reflection by a mirror M reaches the projection objective 180 which throws the image onto a screen (not shown).

The path for the central ray is 175—176—177—178 and the rays from the edges 179 and 179' follow similar paths. It is obvious that only that portion of the reflected light is utilized, which reaches the objective, and, as seen from the drawing, this portion is rather small, because the cones of reflected light, emanating from each point (175, 179, 179') has only a relatively small apex angle.

This angle can be increased, and therewith the brightness of the projected image improved, by using a concave mirror as projection objective, as shown in Fig. 29. Similar to what has been described, the light from a source H passes a condenser system 169, enters the surface 181 of a prism $P_2$, is totally reflected towards the surface 182. An object 184, placed at or near this surface, is thus illuminated and the reflected light from each point radiates towards the separating layer 183. This is shown for only one point near the center, 185, to avoid confusion by too many lines. From this point 185 emerges reflected light, and the portion which lies between the limits of 191—192, around the central ray 186, pass through the separating layer and reach the concave mirror 195. They are reflected back towards the separating layer, but at a slightly altered angle of incidence, so that upon striking this layer they are totally reflected and emerge towards the right side as rays 190 (central ray) and 193—194 (side rays). It is to be noted that the separation layer 183 has thus twice totally reflected and once transmitted the light which emanated from the source H. Inspection of the Figure 29 shows that the apex angle of the cone of reflected light, which is gathered by the concave mirror is substantially greater than that of Fig. 28. Therefore, the brightness of the projected image, all other conditions being the same, will be several times greater. It must however be noted that concave spherical mirrors of large opening show strong aberrations, and that these can be corrected by the use of so-called "Schmidt" lenses, positioned in proper distance with respect to the mirror. This is illustrated in Fig. 29, where the portion of the exit surface of prism P transmitting the projecting beam is profiled as a "Schmidt" lens, as indicated at 196. Similarly, "Schmidt" lenses may be applied to all other devices shown which incorporate concave spherical mirrors. In both of the last two devices, the prisms may advantageously be replaced by kinoptic prisms as before described, particularly where greater dimensions of the reflecting surfaces would make solid, stationary prisms expensive and impractical.

While I have described a plurality of devices which incorporate improved kinoptic structures, together with the mode of operation of each device, it is to be understood that all these are given only by way of examples of the variegated and multitudinous forms in which my invention may be carried out without departing from its basic structure. All such variations and modified forms shall be understood to come within the scope of this invention which shall be limited only by the following claims:

I claim:

1. An optical device for making visible a projected image, comprising a field lens of the Fresnel type and means imparting to all points of said field lens motion in coplanar and substantially equal sized orbits, said field lens having one of its surfaces composed of several interwoven lenticular systems, each of said lenticular systems consisting of a multitude of minute fractional portions of Fresnel ring elements, said portions being spaced apart laterally from each other with the in-between spaces being occupied by similar fractional portions of Fresnel ring elements belonging to the other lenticular systems, all of said fractional portions of Fresnel ring elements being arranged in substantially equal distribution over the entire surface of said field lens, whereby each of said lenticular systems receives and refracts a substantially equal amount of light independent of the other lenticular systems.

2. An optical device of the class described, a field lens and means imparting to all points of said lens coplanar motion of substantially equal-sized orbits, said field lens consisting of a plurality of Fresnel type lenses, each of said Fresnel type lenses being dissected into sectorial parts of an individual size not over the size of said orbit, said sectorial parts being spaced laterally of each other with similar sectorial parts of the other lenses interposed between said first named sectorial parts, whereby all of the parts belonging to any one of said Fresnel type lenses cover only an area which is a proportionate and equal share of the total surface of said field lens.

3. An optical device of the class described, comprising a field lens and means imparting to all points of said lens motion in substantially equal sized orbits coplanar with said lens, at least one of said lens surfaces being a composite in the manner of a mosaic composed of portions of Fresnel type ring-elements, said portions being of an individual size not larger than the size of said orbits of motion.

4. An optical device of the class described, comprising a lens and means imparting to all points of said lens motion in coplanar orbits of substantially equal size and shape, said lens having a surface consisting of a mosiac like composite of portions of ring elements of several different Fresnel lenses whereby adjacent portions belong to different Fresnel lenses, each of said portions of ring elements covering an area smaller than the area circumscribed by a curve substantially identical to said orbits.

RICHARD T. ERBAN.

REFERENCES CITED

The following references are of record in the file of this patent:

UNITED STATES PATENTS

| Number | Name | Date |
|---|---|---|
| 1,241,828 | Davis | Oct. 2, 1917 |
| 1,370,885 | Frederick et al. | Mar. 8, 1921 |
| 1,488,027 | Runcie | Mar. 25, 1924 |
| 1,515,427 | Bouin | Nov. 11, 1924 |
| 1,761,361 | Oberg et al. | June 3, 1930 |
| 1,864,946 | Schrago | June 28, 1932 |
| 1,969,909 | Simjian | Aug. 14, 1934 |
| 2,029,500 | O'Brien | Feb. 4, 1936 |
| 2,082,100 | Dorey et al. | June 1, 1937 |
| 2,087,658 | Shively | July 20, 1937 |
| 2,124,587 | Morrissey | July 26, 1938 |
| 2,132,904 | Martinez et al. | Oct. 11, 1938 |
| 2,189,374 | Surbeck | Feb. 6, 1940 |
| 2,252,467 | Lazzati | Aug. 12, 1941 |
| 2,279,555 | Brown et al. | Apr. 14, 1942 |
| 2,348,818 | Jacobson | May 16, 1944 |

FOREIGN PATENTS

| Number | Country | Date |
|---|---|---|
| 395 | Great Britain | of 1900 |
| 455,288 | Germany | Jan. 28, 1928 |